(12) United States Patent
Koslov et al.

(10) Patent No.: US 7,907,639 B2
(45) Date of Patent: Mar. 15, 2011

(54) METHOD AND APPARATUS FOR SYNCHRONIZING A MULTI-LEVEL MODULATION SIGNAL

(75) Inventors: Joshua Lawrence Koslov, Hopewell, NJ (US); Kumar Ramaswamy, Princeton, NJ (US)

(73) Assignee: Thomson Licensing, Boulogne, Billancourt (FR)

( * ) Notice: Subject to any disclaimer, the term of this patent is extended or adjusted under 35 U.S.C. 154(b) by 1491 days.

(21) Appl. No.: 10/554,936

(22) PCT Filed: Apr. 30, 2004

(86) PCT No.: PCT/US2004/013647
§ 371 (c)(1),
(2), (4) Date: Oct. 31, 2005

(87) PCT Pub. No.: WO2004/100479
PCT Pub. Date: Nov. 18, 2004

(65) Prior Publication Data
US 2007/0030398 A1 Feb. 8, 2007

Related U.S. Application Data (60) Provisional application No. 60/467,946, filed on May 5, 2003.

(51) Int. Cl.
*H04J 3/06* (2006.01)
(52) U.S. Cl. .................................. 370/503; 370/350
(58) Field of Classification Search .................. 370/503, 370/509, 350
See application file for complete search history.

(56) References Cited

U.S. PATENT DOCUMENTS 6,005,940 A * 12/1999 Kulinets .................... 705/51
(Continued)

FOREIGN PATENT DOCUMENTS

EP 1 052 819 A1 11/2000
(Continued)

OTHER PUBLICATIONS

Rohde-Schwarz, New Coder for DVB-S/-DSNG and DVB-C Standards vol. 174, 2002, pp. 38-41, XP002296296.

(Continued)

*Primary Examiner* — Brian D Nguyen
(74) *Attorney, Agent, or Firm* — Robert D. Shedd; Joseph J. Opalach (57) ABSTRACT

A satellite communications system comprises a transmitter, a satellite transponder and a receiver. The transmitter transmits an uplink multi-level modulated signal (hierarchical modulation, layered modulation, etc.) to the satellite transponder, which broadcasts the multi-level modulated signal downlink to one, or more, receivers. The multi-level modulated signal comprises an upper layer and a lower layer. The lower layer conveys LDPC blocks, or LDPC frames, each LDPC block comprising S bits of data including a header portion and a data-bearing portion. The upper layer conveys shorter blocks, each shorter block comprising R bits of data, where R<S, the shorter block also comprising a header portion and a data-bearing portion. The transmitter synchronizes the start of transmission of each LDPC block to the start of transmission of a shorter block. The receiver uses the received shorter blocks to assist in searching for particular data in the lower layer portion of the received multi-level modulated signal. In particular, the receiver searches for synchronization data in the lower layer portion of the received signal upon detection of the header portion in a received shorter block.

16 Claims, 8 Drawing Sheets

U.S. PATENT DOCUMENTS

| | | | |
|---|---|---|---|
| 6,868,093 B1 * | 3/2005 | Bohm et al. | 370/506 |
| 6,954,471 B1 * | 10/2005 | Rousselin et al. | 370/503 |
| 7,075,150 B2 * | 7/2006 | Boyd et al. | 257/347 |
| 2002/0175721 A1 * | 11/2002 | Kanda et al. | 327/141 |
| 2002/0181604 A1 | 12/2002 | Chen | |

FOREIGN PATENT DOCUMENTS

| | | |
|---|---|---|
| EP | 1 335 512 A2 | 8/2003 |
| JP | 2000/278340 | 10/2000 |
| JP | 2001/102963 | 4/2001 |
| JP | 2002/111768 | 4/2002 |
| WO | WO 03/094520 A1 | 11/2003 |

OTHER PUBLICATIONS

Speth M., Seeger A. "Wireless Transmission Using Hierarchical Modulation and Coding: Implications for System Design", vol. 159, Jan. 17, 2000, pp. 193-198, XP001183491.

Morello A. Mignone V., "Il Sistema DVB-S2 di Seconda Generazione Per la Tranmissione Via Satellite e Unicast", Dec. 2003, pp. 5-28, XP002296287 (Translation attached).

International Search Report.

* cited by examiner

METHOD AND APPARATUS FOR SYNCHRONIZING A MULTI-LEVEL MODULATION SIGNAL

This application claims the benefit, under 35 U.S.C. §365 of International Application PCT/US04/13647, filed Apr. 30, 2004 which was published in accordance with PCT Article 21(2) on Nov. 18, 2004 in English and which claims the benefit of U.S. provisional patent application No. 60/467,946 filed May 5, 2003.

BACKGROUND OF THE INVENTION

The present invention generally relates to communications systems and, more particularly, to satellite-based communications systems.

As described in U.S. Pat. No. 5,966,412 issued Oct. 12, 1999 to Ramaswamy, a form of multi-level modulation such as hierarchical modulation can be used in a satellite system as a way to continue to support existing legacy receivers yet also provide a growth path for offering new services. In other words, a hierarchical modulation based satellite system permits additional features, or services, to be added to the system without requiring existing users to buy new satellite receivers. In a hierarchical modulation based communications system, at least two signals, e.g., an upper layer (UL) signal and a lower layer (LL) signal, are added together to generate a synchronously modulated (i.e., symbol-synchronized) satellite signal for transmission. In the context of a satellite-based communications system that provides backward compatibility, the LL signal provides additional services, while the UL signal provides the legacy services, i.e., the UL signal is, in effect, the same signal that was transmitted before—thus, the satellite transmission signal can continue to evolve with no impact to users with legacy receivers. As such, a user who already has a legacy receiver can continue to use the legacy receiver until such time that the user decides to upgrade to a receiver, or box, that can recover the LL signal to provide the additional services.

In a similar vein, another form of multi-level modulation—layered modulation—can also be used to provide an approach that is backward compatible. In a layered modulation based system at least two signals are modulated (again, e.g., a UL signal (legacy services) and an LL signal (additional services)) onto the same carrier (possibly asynchronously with each other). Transmission of the UL signal and the LL signal occur separately via two transponders and the front end of a layered modulation receiver combines them before recovery of the data transported therein.

SUMMARY OF THE INVENTION

It has been observed that in a multi-level modulated signal based communications system, one layer, e.g., the lower layer, may utilize a low density parity check (LDPC) code and, therefore, convey very long coding blocks of data. For example, an LDPC block may be on the order of 64 Kbits (thousands of bits, where 1 K=1024 bits) and include a header portion and a data-bearing portion, wherein the header portion may further include synchronization data so that a receiver may synchronize to the start of an LDPC block. As such, even if the signals of the various layers of the multi-modulated signal are synchronized at the symbol level, detection in the receiver of the synchronization data in a lower layer LDPC block may involve searching through large amounts of data, e.g., most, if not all, of the 65,536 bits of an LDPC block—which further adds to processing overhead in the receiver.

Therefore, and in accordance with the principles of the invention, in a multi-level modulated signal at least one other layer is used as an aid for finding particular data in another one of the layers.

In an embodiment of the invention, a satellite communications system comprises a transmitter, a satellite transponder and a receiver. The transmitter transmits an uplink multi-level modulated signal (hierarchical modulation, layered modulation, etc.) to the satellite transponder, which broadcasts the multi-level modulated signal downlink to one, or more, receivers. The multi-level modulated signal comprises an upper layer and a lower layer. The lower layer conveys LDPC blocks, or LDPC frames, each LDPC block comprising S bits of data including a header portion and a data-bearing portion. The upper layer conveys shorter blocks, each shorter block comprising R bits of data, where R<S, the shorter block also comprising a header portion and a data-bearing portion. The transmitter synchronizes the start of transmission of each LDPC block to the start of transmission of a shorter block. The receiver uses the received shorter blocks to assist in searching for particular data in the lower layer portion of the received multi-level modulated signal. In particular, the receiver searches for synchronization data in the lower layer portion of the received signal upon detection of the header portion in a received shorter block.

DETAILED DESCRIPTION

Other than the inventive concept, the elements shown in the figures are well known and will not be described in detail. Also, familiarity with satellite-based systems is assumed and is not described in detail herein. For example, other than the inventive concept, satellite transponders, downlink signals, symbol constellations, a radio-frequency (rf) front-end, or receiver section, such as a low noise block downconverter, formatting and encoding methods (such as Moving Picture Expert Group (MPEG)-2 Systems Standard (ISO/IEC 13818-1)) for generating transport bit streams and decoding methods such as log-likelihood ratios, soft-input-soft-output (SISO) decoders, Viterbi decoders are well-known and not described herein. In addition, the inventive concept may be implemented using conventional programming techniques, which, as such, will not be described herein. It should be noted that the terms frame, block and packet are used herein interchangeably. Finally, like-numbers on the figures represent similar elements.

As noted above, in a multi-level modulated signal (hierarchical modulation, layered modulation, etc.) based communications system, one layer, e.g., the lower layer, may utilize a low density parity check (LDPC) code and, therefore, convey very long coding blocks (or frames or packets) of data. For example, an LDPC block may be on the order of 64 Kbits (thousands of bits, where 1 K=1024 bits) and include a header portion and a data-bearing portion, wherein the header portion may further include synchronization (sync) data so that a receiver may synchronize to the start of an LDPC block and wherein the data-bearing portion includes user data (which may additionally include, e.g., parity data). As such, even if the signals of the various layers of the multi-modulated signal are synchronized at the symbol level, detection in the receiver of the synchronization data in a lower layer LDPC block may involve searching through large amounts of data, e.g., most, if not all, of the 65,536 bits of an LDPC block—which further adds to processing overhead in the receiver. Therefore, and in accordance with the principles of the invention, in a multi-level modulated signal at least one other layer is used as an aid for finding particular data in another one of the layers.

Figure 1:
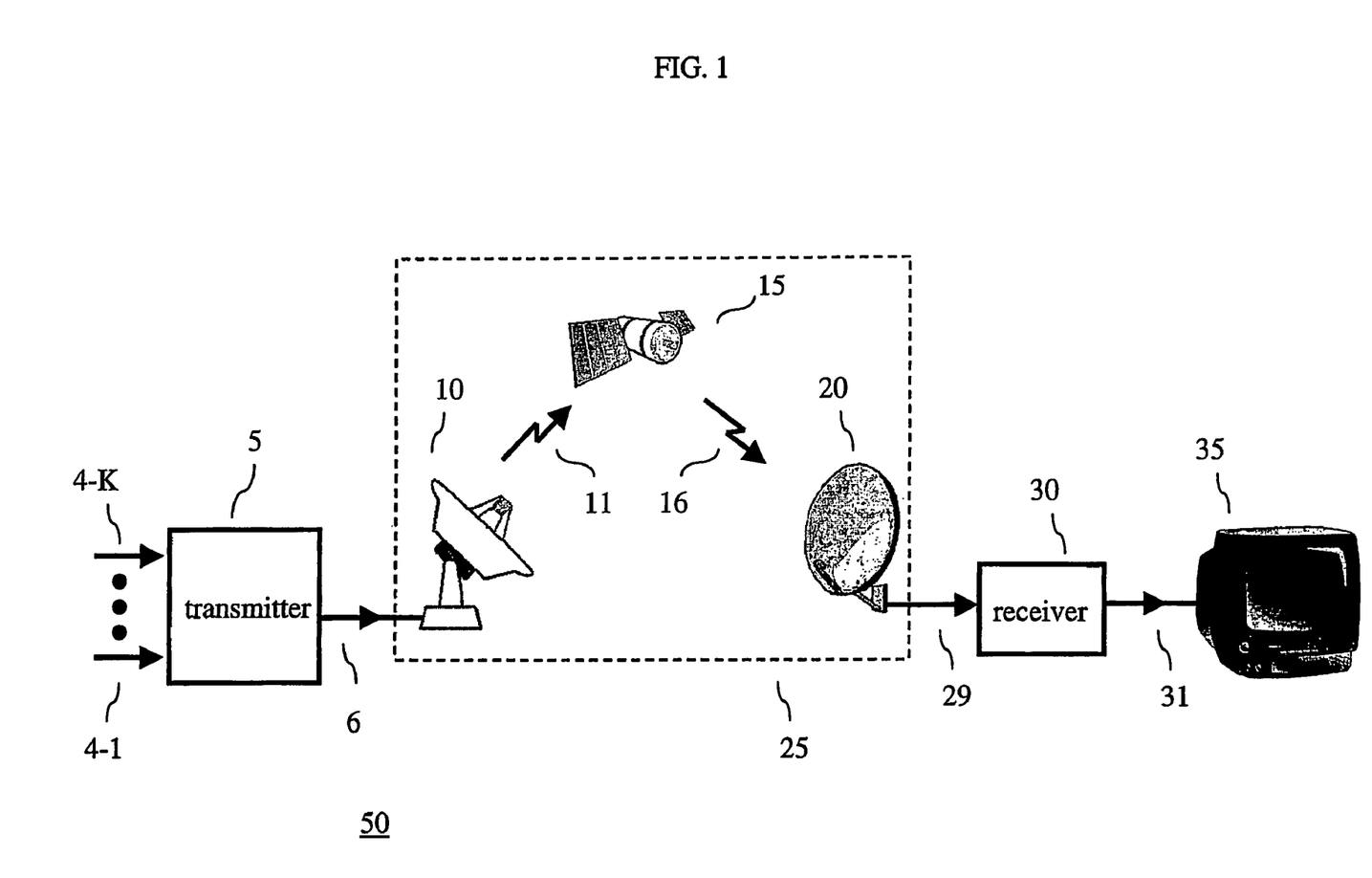
FIG. 1 shows an illustrative satellite communications system embodying the principles of the invention.

An illustrative communications system 50 in accordance with the principles of the invention is shown in FIG. 1. Communications system 50 includes transmitter 5, satellite channel 25, receiver 30 and television (TV) 35. Although described in more detail below, the following is a brief overview of communications system 50. Transmitter 5 receives a number of data streams as represented by signals 4-1 through 4-K and provides a multi-level modulated signal 6 to satellite transmission channel 25. Illustratively, these data streams represent control signaling, content (e.g., video), etc., of a satellite TV system and may be independent of each other or related to each other, or a combination thereof. The multi-level modulated signal 6 represents a hierarchical modulation based signal or a layered modulation based signal, etc., having K layers, where K≧2. It should be noted that the words "layer" and "level" are used interchangeably herein. Further, a particular data stream such as signal 4-1 may already represent an aggregation of other data streams (not shown). Satellite channel 25 includes a transmitting antenna 10, a satellite 15 and a receiving antenna 20. Transmitting antenna 10 (representative of a ground transmitting station) provides multi-level modulated signal 6 as uplink signal 11 to satellite 15. The latter provides for retransmission of the received uplink signal via downlink signal 16 (which is typically at a different frequency than the uplink signal) to a broadcast area. This broadcast area typically covers a predefined geographical region, e.g., a portion of the continental United States. Downlink signal 16 is received by receiving antenna 20, which provides a received signal 29 to receiver 30, which demodulates and decodes received signal 29 in accordance with the principles of the invention to provide, e.g., content to TV 35, via signal 31, for viewing thereon. It should be noted that although not described herein, transmitter 5 may further predistort the signal before transmission to compensate for non-linearities in the channel.

Figure 2:
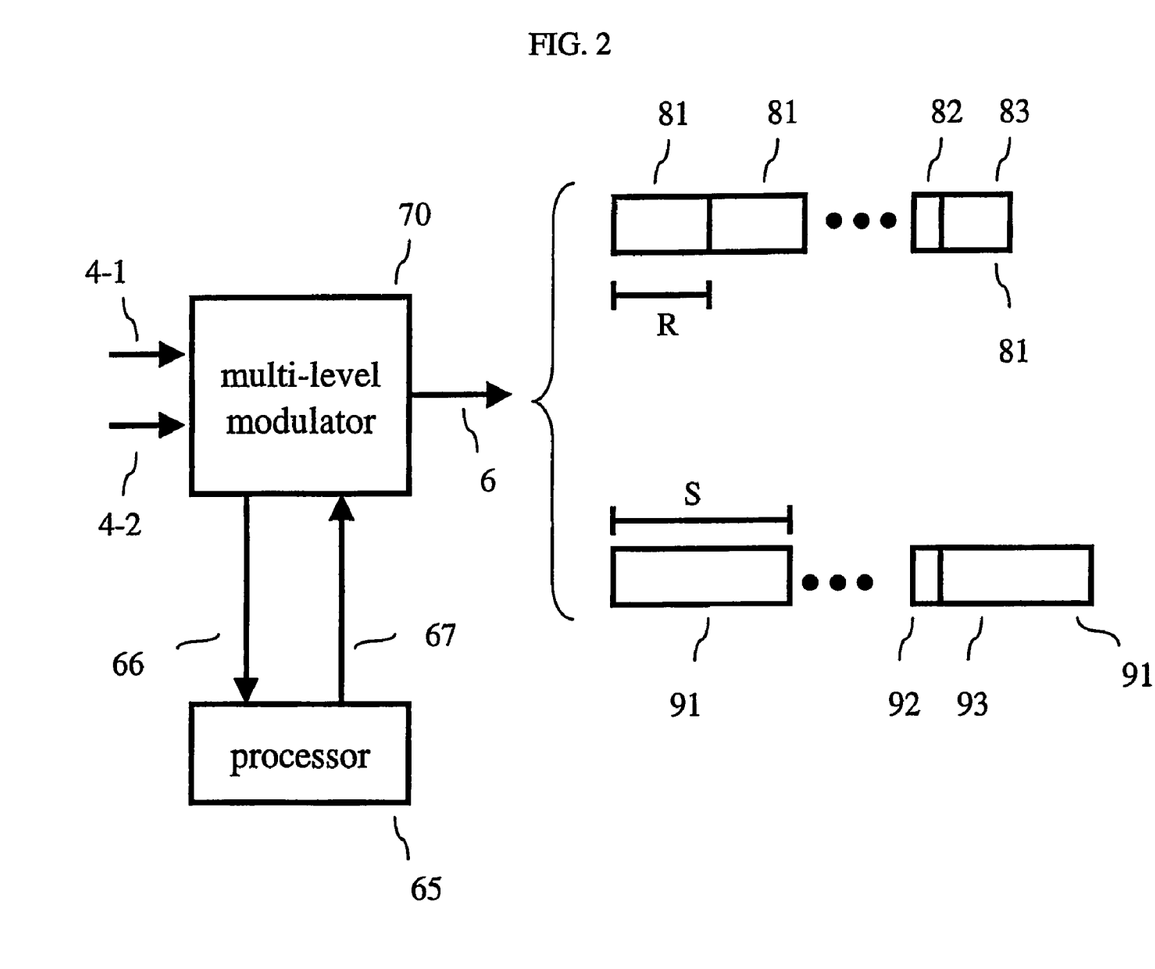
FIG. 2 shows an illustrative embodiment of transmitter 5 of FIG. 1 in accordance with the principles of the invention.

Turning now to FIG. 2, an illustrative embodiment of transmitter 5 in accordance with the principles of the invention is shown. For the remainder of this description, it is assumed that multi-modulated signal 6 is a hierarchical modulation based signal and that K=2. However, it should be noted that the inventive concept is not so limited. Transmitter 5 includes multi-level modulator 70 and processor 65. The latter is representative of one or more microprocessors and/or digital signal processors (DSPs) and may include additional memory (not shown) for executing programs and storing data. Likewise, multi-level modulator 70 is representative of encoders, buffers, modulators, etc., (not shown for simplicity) for providing multi-level modulated signal 6. In this regard, and as can be observed from FIG. 2, multi-level modulator 70 encodes and modulates data stream 4-1 into an upper layer (UL) modulated signal, and encodes and modulates data stream 4-2 into a lower layer (LL) modulated signal. The UL signal is a stream of UL packets 81, each UL packet 81 comprising R bits and including a header portion 82 and a data-bearing portion 83. Illustratively, the packets convey MPEG data in accordance with the above-mentioned standard. In comparison, the LL signal is a stream of LL packets 91, each LL packet 91 comprising S bits and including a header portion 92 and a data-bearing portion 93, where R<S. For the purposes of this description, it is assumed that each LL packet 91 represents an LDPC coding block. Illustratively, R is 188 bits and S is 65,536 bits. In addition, it is assumed that sync data is conveyed as a part of each LL packet 91, e.g., as a part of header 92.

Figure 3:
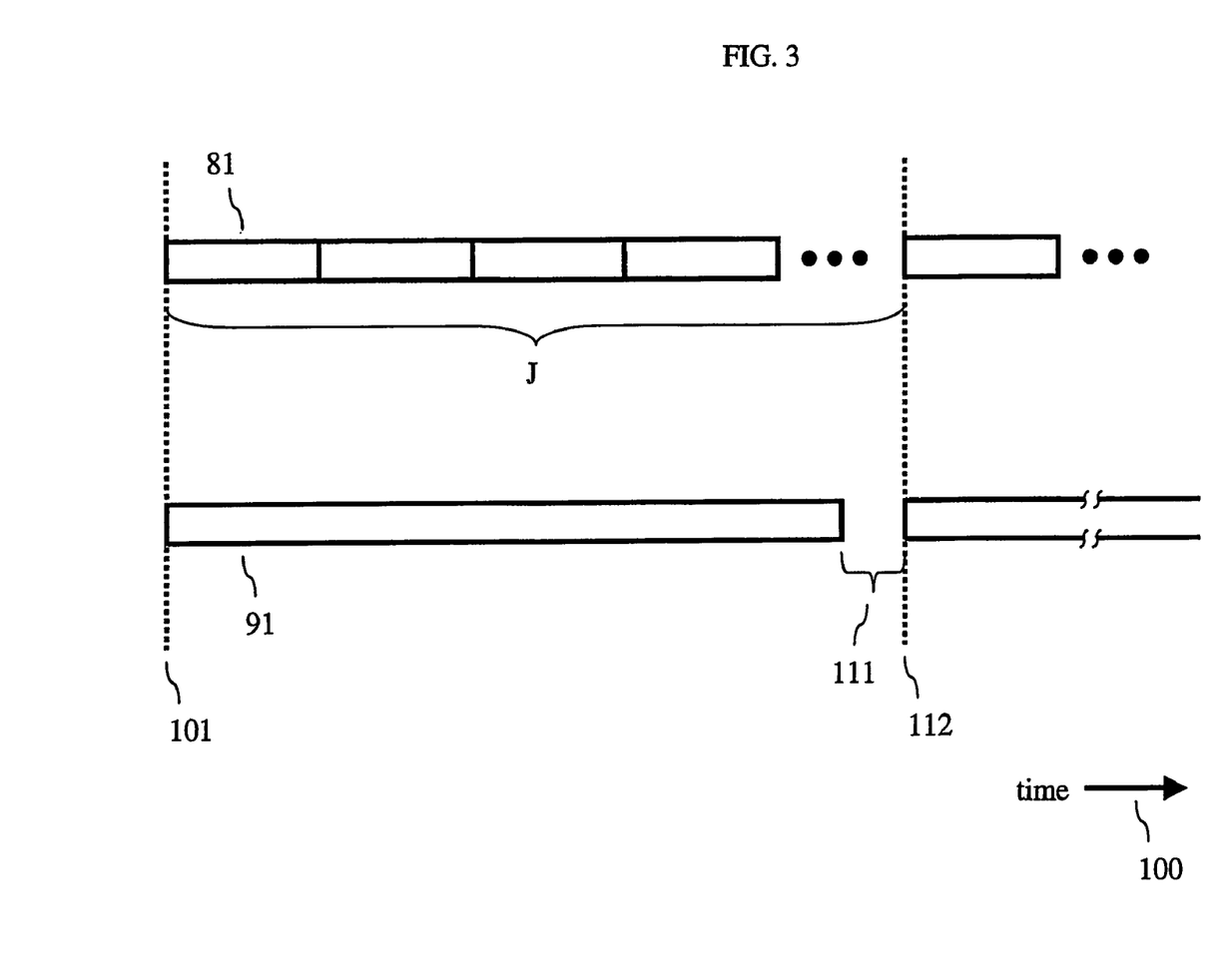
FIG. 3 shows a further illustration of the inventive concept with respect to transmitter 5 of FIG. 2.

Referring now to FIG. 3, a further illustration of the operation of transmitter 5 in accordance with the principles of the invention is shown. In particular, the start of transmission of an LL packet 91 is synchronized to a signal, or a portion thereof, in one, or more, of the other layers. For example, in the illustration of FIG. 3, the start of transmission of an LL packet 91 is synchronized to the start of transmission of a UL packet 81 occurring at a time 101, with time passing from earlier to later as illustrated by time axis 100. As such, a number, J, of UL packets 91 are transmitted before the start of the next LL packet at time 112, where J>1. It should be observed from FIG. 3 that since transmission of an LL packet 91 is triggered from a UL packet 81, it may be the case that a time delay, 111, will occur between the transmission of consecutive LL packets. It can also be observed from FIG. 3 that the transmission rate in bits/second for the upper layer compared to the lower layer is such that at least J UL packets 91 are transmitted in their entirety for every one LL packet 81.

Figure 4:
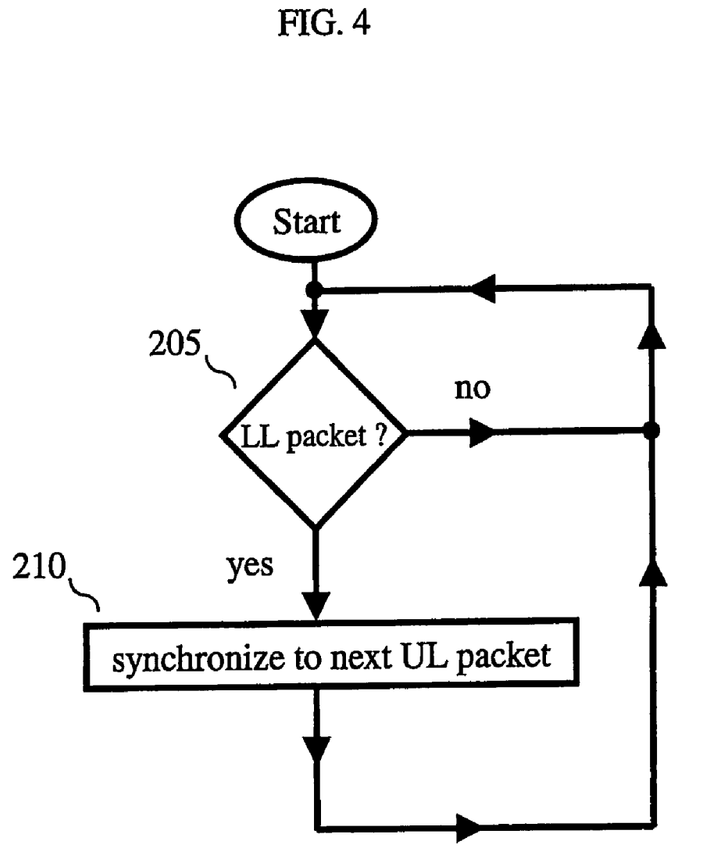
FIG. 4 shows an illustrative flow chart in accordance with the principles of the invention for use in transmitter 5 of FIG. 2.

In view of the above, an illustrative method in accordance with the principles of the invention for use in transmitter 5 of FIG. 2 is shown in FIG. 4. In step 205, processor 65, of FIG. 2, periodically checks, e.g., via signal 66 of FIG. 2, if multi-level modulator 70 has an LL packet 91 ready to transmit. Upon detection that an LL packet 91 is ready for transmission, processor 65 causes, e.g., via signal 67 of FIG. 2, multi-level modulator 70 to synchronize the transmission of the ready LL packet 91 with the transmission of the next available UL packet 81 (as represented by time 101, or time 112, of FIG. 3).

Figure 5:
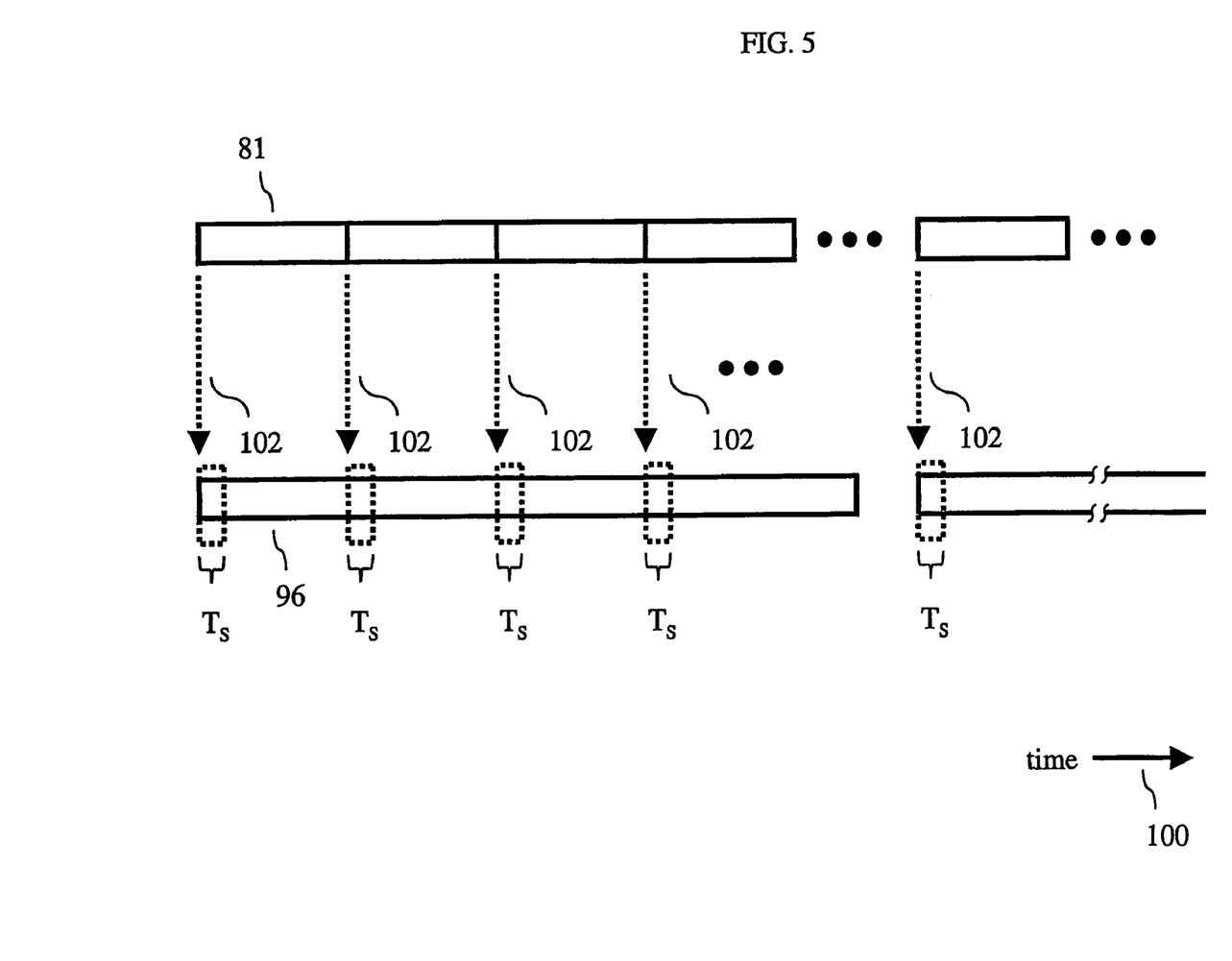
FIGS. 5 and 6 illustrate the inventive concept with respect to receiver 30 of FIG. 1.
Figure 6:
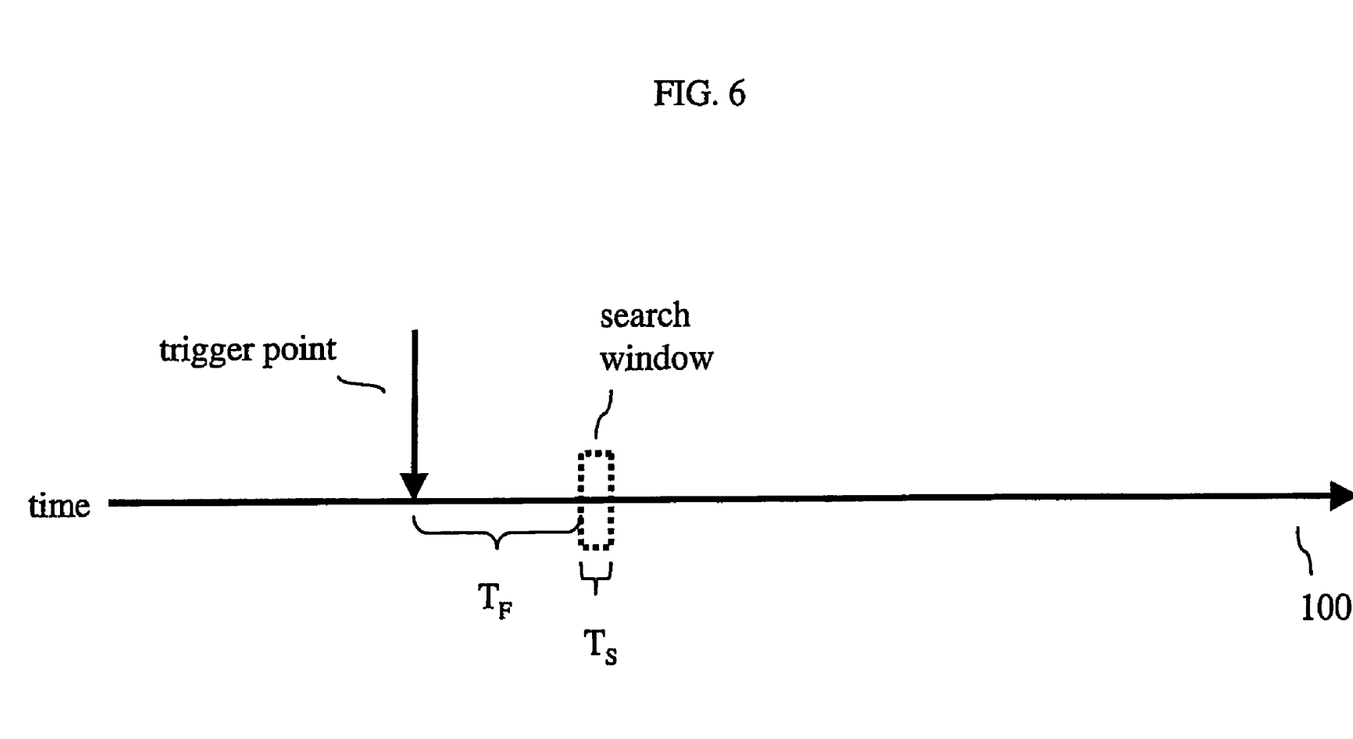

Since the start of an LL packet has a fixed relationship to a signal, or a portion thereof, in one, or more, of the other layers, receiver 30 can now search for particular data, e.g., sync data, in the lower layer portion of the received multi-level modulation signal (the received LL signal 96) in a more expeditious fashion by leveraging off of this fixed relationship. Attention should now be directed to FIG. 5, which illustrates the operation of receiver 30 in accordance with the principles of the invention. Again, it is assumed that the particular data is sync data and that the sync data would occur at, or near, the beginning of a received LL packet, e.g., in a header 92 of an LL packet 91. Since, as described above, the transmission of an LL packet is synchronized to the start of a UL packet, receiver 30 searches for sync data in the received LL signal 96 only for a period of time $T_s$ after the detection of the start of a header of a received UL packet 81 as represented by the various dotted arrows 102 of FIG. 5. The length of the time period $T_s$ is selected to substantially cover the length of a header 92 of an LL packet 91. Thus, receiver 30 does not have to search the entire received LL signal 96 for the occurrence of the particular data of interest. In other words, receiver 30 uses a signal, or a portion thereof, from one, or more, of the other layers as a trigger point in performing a search in a window of time (the search window) for particular data in another layer, e.g., the lower layer. With respect to the above illustration, the trigger point is the detection of the start of a header in an UL packet (in this example, an MPEG packet) and the search window is the time interval $T_s$. In this example, there was little, if no delay, between the detection of the trigger point and the invocation of the search window. However, the inventive concept is not so limited and there may be a further time delay, $T_F$, between detection of the trigger point and the start of the search, as illustrated in FIG. 6.

Figure 7:
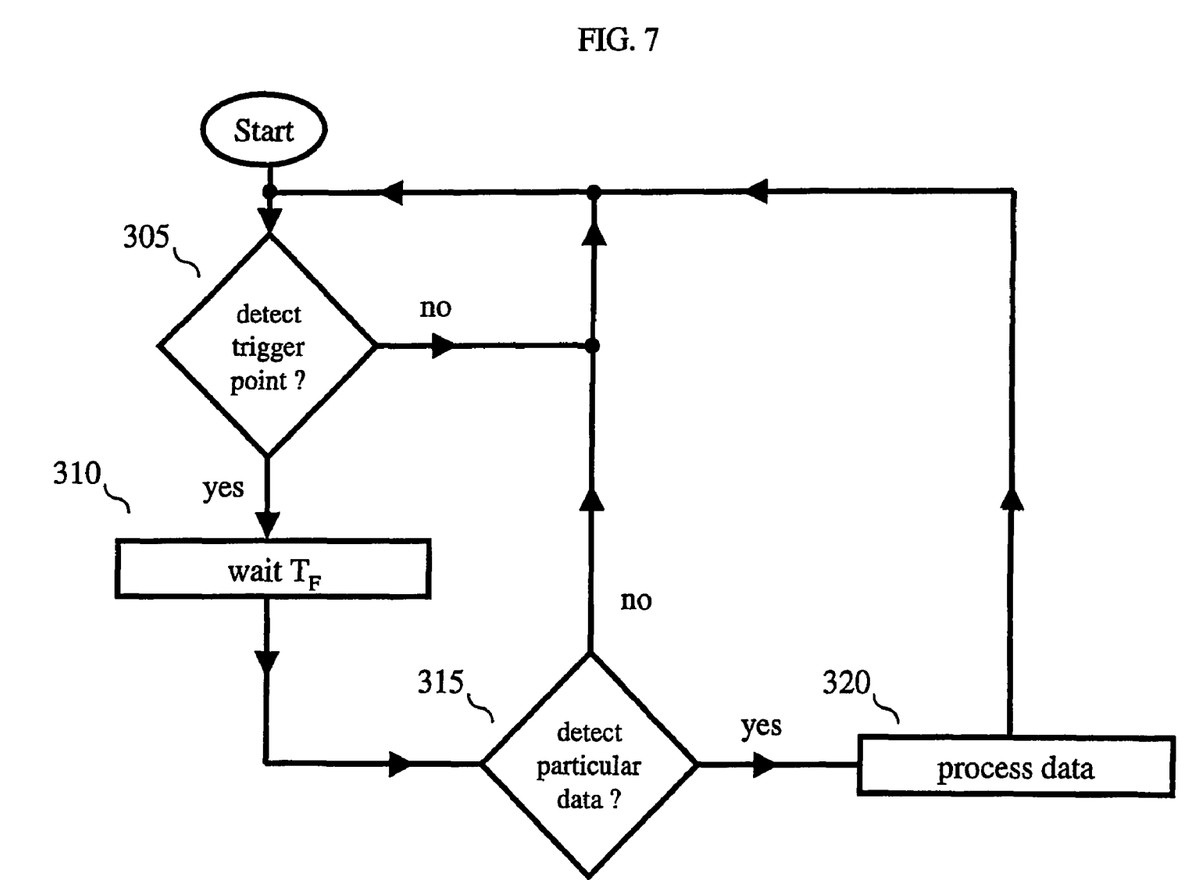
FIG. 7 shows an illustrative flow chart in accordance with the principles of the invention for use in receiver 30 of FIG. 1.

An illustrative method in accordance with the principles of the invention for use in receiver 30 of FIG. 1 is shown in FIG. 7. In step 305, receiver 30 searches for the trigger point in one, or more, of the other layers. In this example, receiver 30 searches for the start of a UL packet, e.g., detection of a header. Once the trigger point is detected, receiver 30 waits an amount of time $T_F$ in step 310. However, in this example, $T_F$ is illustratively equal to zero, i.e., there is no substantive delay between detection of the trigger point and initiation of the search window. In step 315, receiver 30 searches for particular data in the received LL signal during the search window of length $T_s$. Again, in this example, the particular data is sync data. If no sync data is detected in the received LL signal, then execution returns to step 305 and awaits detection of the next trigger point to begin the search anew. However, if the particular data is detected in step 315, receiver 30 further processes the received data in step 320 to, e.g., decode the data conveyed by the received LL packet.

In view of the above, if J=64, then receiver 30 performs, worst case, 64 relatively short searches for the sync data present in the received LL signal rather than having to search all of the received LL data and, therefore, the overall time spent searching by receiver 30 is significantly reduced. Thus, and in accordance with a feature of the invention, synchronization to the received LL signal is aided by the use of shorter blocks (e.g., MPEG packets) conveyed in one, or more, UL signals.

Figure 8:
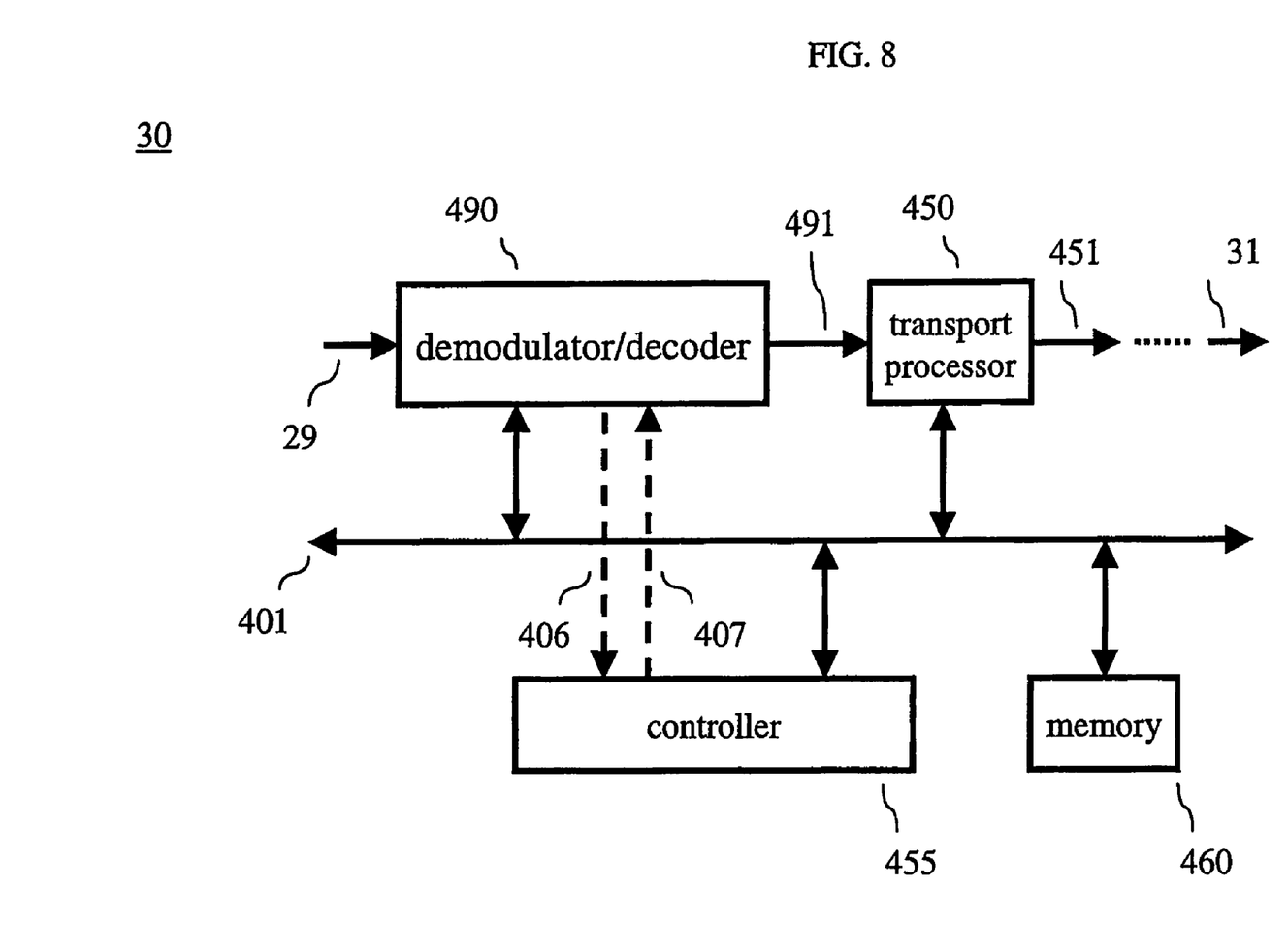
FIG. 8 shows an illustrative block diagram of a receiver in accordance with the principles of the invention.

Referring now to FIG. 8, an illustrative embodiment of receiver 30 is shown. It should be noted that only those elements of receiver 30 relevant to the principles of the invention are shown. Receiver 30 includes demodulator/decoder 490, transport processor 450, controller 455 and memory 460. Demodulator/decoder 490 includes circuitry for receiving multi-level modulated signal 29 and recovering therefrom data conveyed over the various layers as represented by data signal 491. In this regard, demodulator/decoder 490 may include separate demodulators/decoders for each layer of the received signal 29 or be representative of a unified receiver as described in U.S. Provisional Application No. 60/467,946 filed May 5, 2003. Both transport processor 450 and controller 455 are each representative of one or more microprocessors and/or digital signal processors (DSPs) and may include memory for executing programs and storing data. In this regard, memory 460 is representative of memory in receiver 30 and includes, e.g., any memory of transport processor 450 and/or controller 455. An illustrative bidirectional data and control bus 401 couples various ones of the elements of receiver 30 together as shown in FIG. 8. Bus 401 is merely representative, e.g., individual signals (in a parallel and/or serial form) may be used, etc., for conveying data and control signaling between the elements of receiver 30. Transport processor 490 processes data signal 491 for distributing video, audio and data bits as represented by content signal 451 to appropriate subsequent circuitry (not shown) and is eventually provided, via signal 31, to TV 35. It should be noted that receiver 30 may receive commands, e.g., program selection, via a remote control (not shown). Controller 455 illustratively executes the above-described flow chart of FIG. 7 via instructions stored in memory 460 and accordingly controls demodulator/decoder 490 for searching for the sync data of the received LL signal via bus 401 as represented by dashed arrows 406 and 407.

In view of the above, it should also be noted that although described in the context of a satellite communications system, the inventive concept is not so limited and applies to terrestrial broadcast, etc. Likewise, although the inventive concept was described in the content of a lower layer that utilizes an LDPC code, the inventive concept is not so limited and is applicable to any multi-layered modulation system whether or not an LDPC code is used. For example, there may be more than two layers and one, or more, of the layers may be used to assist in synchronization to another of the layers or to search for particular data in another one of the layers. Further, other coding schemes may be used such as, but not limited to, turbo coding. In addition, the start of transmission of an LL block can be synchronized to other portions of one, or more, UL signals (e.g., the end of a UL block), or related in a different way to an UL block (e.g., transmission of an LL block can be delayed after the start of transmission of an UL block by a fixed amount of time, $T_D$). Also, a lower layer may convey shorter data frames than an upper layer and, thus, the shorter data frames of the lower layer may be used to assist in finding particular data, or synchronization to, an upper layer.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements may be implemented in a stored-program-controlled processor, e.g., a digital signal processor (DSP) or microprocessor that executes associated software, e.g., corresponding to one or more of the steps shown in FIGS. 4 and 7. Further, although shown as separate elements, the elements therein may be distributed in different units in any combination thereof. For example, receiver 30 may be a part of TV 35. It is therefore to be understood that numerous modifications may be made to the illustrative embodiments and that other arrangements may be devised without departing from the spirit and scope of the present invention as defined by the appended claims.

The invention claimed is:

1. A method for use in a receiver, the method comprising:
   receiving a multi-level modulated signal comprising at least two signal layers, wherein one of the signal layers conveys shorter packets than another signal layer;
   detecting a trigger point in the one of the signal layers conveying the shorter packets; and
   subsequent to detection of the trigger point, searching the other signal layer in a window of time, $T_s$, for particular data.

2. The method of claim 1, wherein the one of the signal layers conveying the shorter packets is an upper signal layer and the other signal layer is a lower signal layer.

3. The method of claim 2 wherein an upper layer packet is an MPEG packet.

4. The method of claim 2, wherein an upper layer packet includes a header portion and the trigger point is a start of the header portion.

5. The method of claim 1, wherein the particular data is synchronization data.

6. The method of claim 1, further comprising the step of waiting a predetermined amount of time between the detecting step and the searching step.

7. The method of claim 1, wherein the multi-level modulated signal is a hierarchical modulation based signal.

8. The method of claim 1, wherein the multi-level modulated signal is a layered modulation based signal.

9. A receiver comprising:
   a demodulator for recovering data from a received multi-level modulated signal having at least two signal layers, wherein one of the signal layers conveys shorter packets than another signal layer, and
   a processor for controlling the demodulator such that the demodulator searches in a window of time, $T_s$, for particular data in the other signal layer of the received multi-level signal after detection of a trigger point in the one of the signal layers of the received multi-level signal conveying the shorter packets.

10. The receiver of claim 9, wherein the particular data is synchronization data.

11. The receiver of claim 9, wherein the received multi-level signal is a received hierarchical-modulation based signal.

12. The receiver of claim 9, wherein the received multi-level signal is a received layered-modulation based signal.

13. The receiver of claim 9, wherein the one of the signal layers conveying the shorter packets is an upper signal layer and the other signal layer is a lower signal layer.

14. The receiver of claim 13, wherein an upper layer packet is an MPEG packet.

15. The receiver of claim 13, wherein an upper layer packet includes a header portion and the trigger point is a start of the header portion.

16. The receiver of claim 9, wherein the demodulator waits a predetermined amount of time after detection of the trigger point to search for the particular data.

* * * * *